United States Patent [19]

Delgado Barri

[11] 4,011,553
[45] Mar. 8, 1977

[54] REMOTE DETECTOR TO INDICATE LEAKAGE OF LIQUIDS IN TOILET TANKS

[76] Inventor: Luis Delgado Barri, Benito Juarez y Madero, Tampico, Tamaulipas, Mexico

[22] Filed: Mar. 19, 1976

[21] Appl. No.: 669,433

Related U.S. Application Data

[63] Continuation of Ser. No. 503,897, Sept. 6, 1974, abandoned.

[30] Foreign Application Priority Data

Oct. 24, 1973 Mexico .................. 146996

[52] U.S. Cl. .................. 340/242; 200/61.05; 340/239 R; 340/244 C
[51] Int. Cl.² .................. G08B 21/00
[58] Field of Search .......... 340/242, 244 R, 244 C, 340/213 R, 239 R; 73/49.2, 304 R; 307/118; 200/61.04, 61.05, 61.06; 324/65 P

[56] References Cited

UNITED STATES PATENTS

| 2,360,434 | 10/1944 | Manning | 340/242 |
|---|---|---|---|
| 2,605,342 | 7/1952 | Spurling | 340/213 R X |
| 2,752,586 | 6/1956 | Jordan | 200/61.04 X |
| 2,798,215 | 7/1957 | Domingo et al. | 340/239 R |
| 3,365,710 | 1/1968 | Duplessy | 340/242 |
| 3,582,930 | 6/1971 | Wiley | 340/244 C |

FOREIGN PATENTS OR APPLICATIONS

| 719,311 | 10/1965 | Canada | 200/61.04 |
|---|---|---|---|
| 849,770 | 9/1952 | Germany | 340/244 C |

*Primary Examiner*—John W. Caldwell
*Assistant Examiner*—Daniel Myer
*Attorney, Agent, or Firm*—Ladas, Parry, Von Gehr, Goldsmith & Deschamps

[57] ABSTRACT

A luminous and/or audible remote detector to indicate leakage of liquids in stationary tanks, such as for toilets and the like, comprising one or several pairs of electrodes installed at a certain level of the tank or inside the drain pipe of same. Each pair of electrodes being connected to a source of energy and to a lamp and/or bell located on a remote display board. Each pair of electrodes actuating as a normally open or closed switches depending if they are located above or below of the normal level of the liquid contained in said tank, which serves as conductor between said electrodes, producing the energizing of the lamp or bell connected to its circuit and indicating visually or audibly to a supervisor malfunctioning or leakage of liquid in the normal operation of said tank.

1 Claim, 6 Drawing Figures

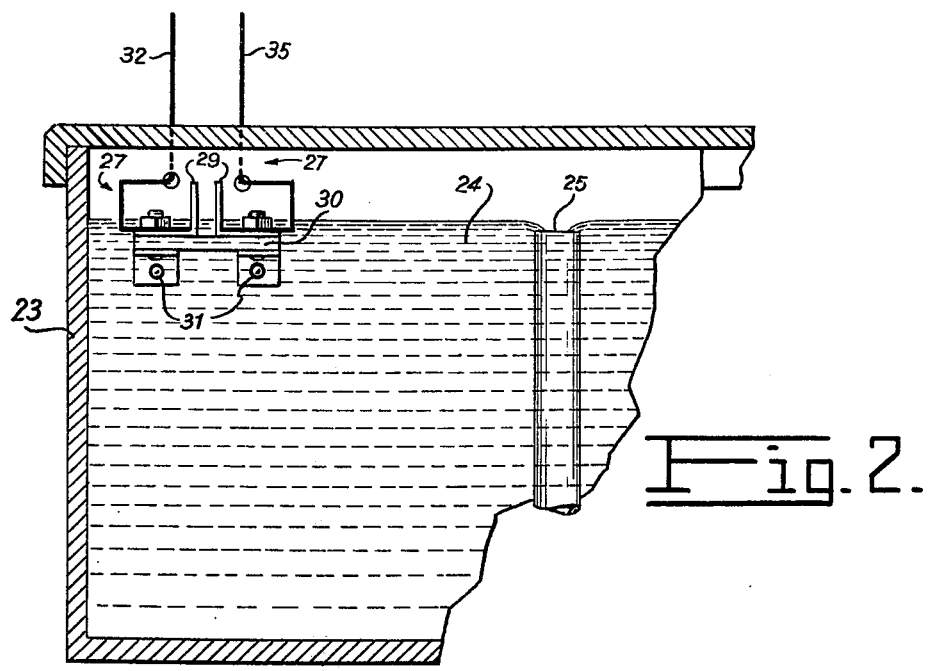
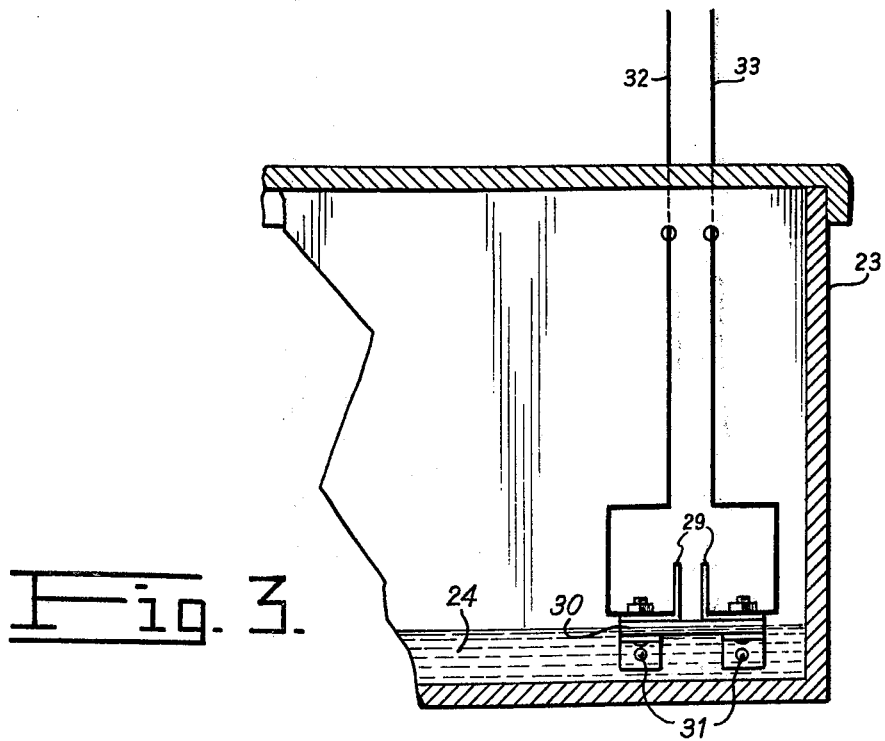

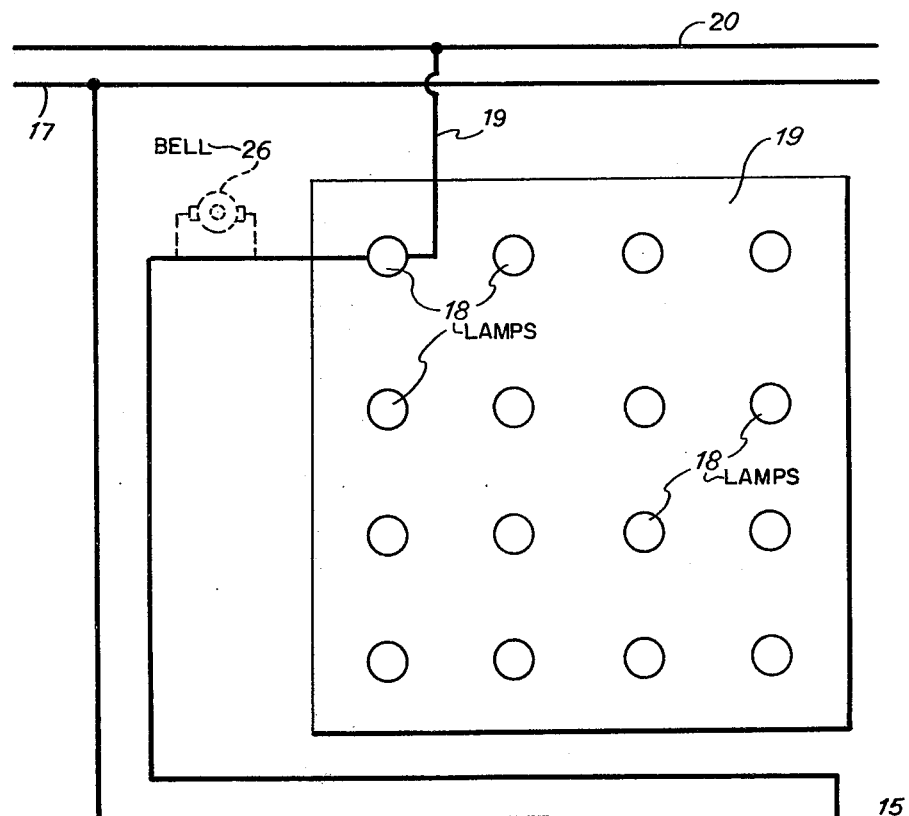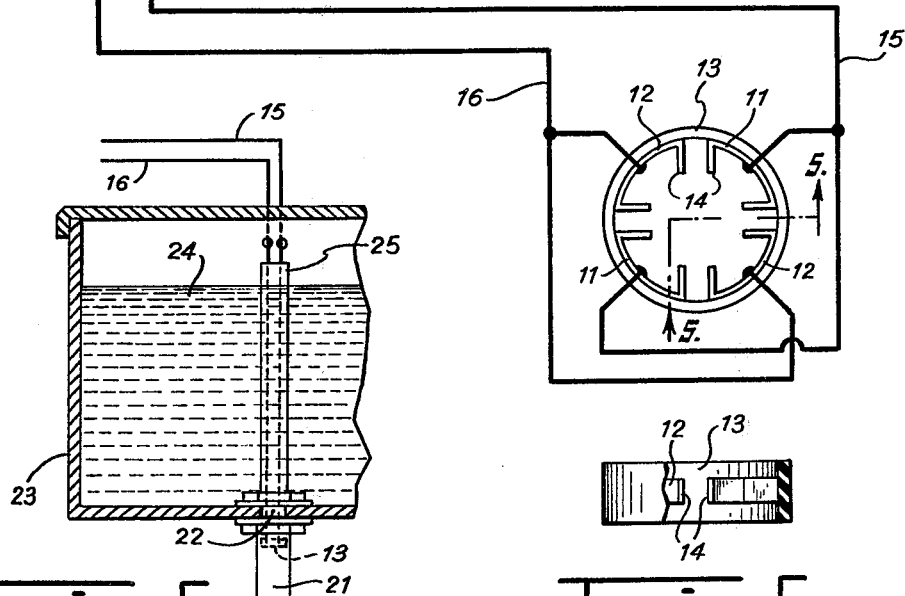

4,011,553

REMOTE DETECTOR TO INDICATE LEAKAGE OF LIQUIDS IN TOILET TANKS

This is a continuation of application Ser. No. 503,897 filed Sept. 6, 1974, now abandoned.

BACKGROUND OF THE INVENTION

This invention refers to remote detectors for leaks of liquids and more particularly to a remote detector with light and/or audible warning to indicate leaks of liquids in stationary tanks such as toilet tanks and the like.

At the present time all countries have placed special emphasis on the development of the tourist industry because of its direct relationship with the national economy. The tourist industry in turn is based fundamentally on the hotel industry; and in the latter it has been determined that water leaks mainly in toilet tanks represent a significant cost, in addition to the considerable waste of this ever more necessary liquid.

Maintenance or supervision to control water leaks in toilet tanks increases costs and makes the hotel industry less profitable.

SUMMARY OF THE INVENTION

In view of the foregoing, an industrial, novel and important result is achieved by the remote leak detector of this invention which indicates to a supervisor visibly or audibly the water leaks in each of the rooms of the hotel, of a hospital, etc., either because of a very frequent failure in sealing the drain or because the level in the tank has risen higher than the overflow, thus causing the leak, because of failure in the float valve or the like, which should prevent the continuation of liquid flow into the tank in the normal operation of same.

The detector of the present invention consists of one or several pairs of electrodes separated and physically installed inside the drain pipe of the toilet tank, with one electrode of each pair connected to a source of energy which can be the light circuit, and the other to a lamp and/or a bell on a remote display board; the circuit, which will normally be open for each pair of electrodes, will be closed each time water flows through the tank discharge, and the corresponding lamp will flash on, indicating to the supervisor in which one of all the toilets in the hotel or hospital the undesired leak is occurring; this visual indication of leak can be accompanied by a warning bell.

In another embodiment of this invention, two pairs of electrodes are separately located, an upper pair at the level of the overflow and a lower pair slightly above the outlet. Each of these pairs of electrodes is connected to an energy source on one side, and on the other to an indicator lamp in a distant display board. In this embodiment there are two lamps for every toilet tank, one to show the upper leak, and the other to show the lower leak.

When the liquid is escaping through the overflow pipe in the upper level, the circuit is closed between the upper electrodes, and the corresponding lamp lights.

When the discharge is occurring at the lower level through the discharge outlet, the circuit of the lower pair of electrodes will open, extinguishing the corresponding bulb.

In both embodiments the normal discharge of each toilet will turn on the indicating lights but in a manner easily recognizable by the supervisor, different from that caused by leaks.

A general switch can be incuded in the circuit so that the indicating lamps will work only when the supervisor connects the switch.

These and other objects to be obtained with this invention will be better understood and more fully appreciated in reading the following description which refers to the accompanying drawings of the preferred embodiments of this invention.

DETAILED DESCRIPTION OF THE DRAWINGS

FIG. 2, is a partial schematic broken view of a stationary toilet tank or the like, indicating the position of one embodiment of the remote detector for leaks of this invention, located in the upper level of the tank.

FIG. 3, is a partial schematic broken view of a stationary toilet tank or the like, indicating the position of one embodiment of the remote detector for leaks of this invention, located in the lower level of the tank.

FIG. 4, is a partial schematic view illustrating the electric circuit of one embodiment of the remote detector of leaks in a stationary tank of the present invention, which uses only one group of electrodes.

FIG. 5, is a view in vertical elevation with a detail cut to illustrate the annular support of the electrodes of the detector illustrated in FIG. 4.

FIG. 6, is a partial schematic view of a stationary toilet tank showing the position of the electrodes of the leak detector of the present invention, of the embodiment illustrated in FIGS. 4 and 5.

DETAILED DESCRIPTION OF THE INVENTION

Figure 1:
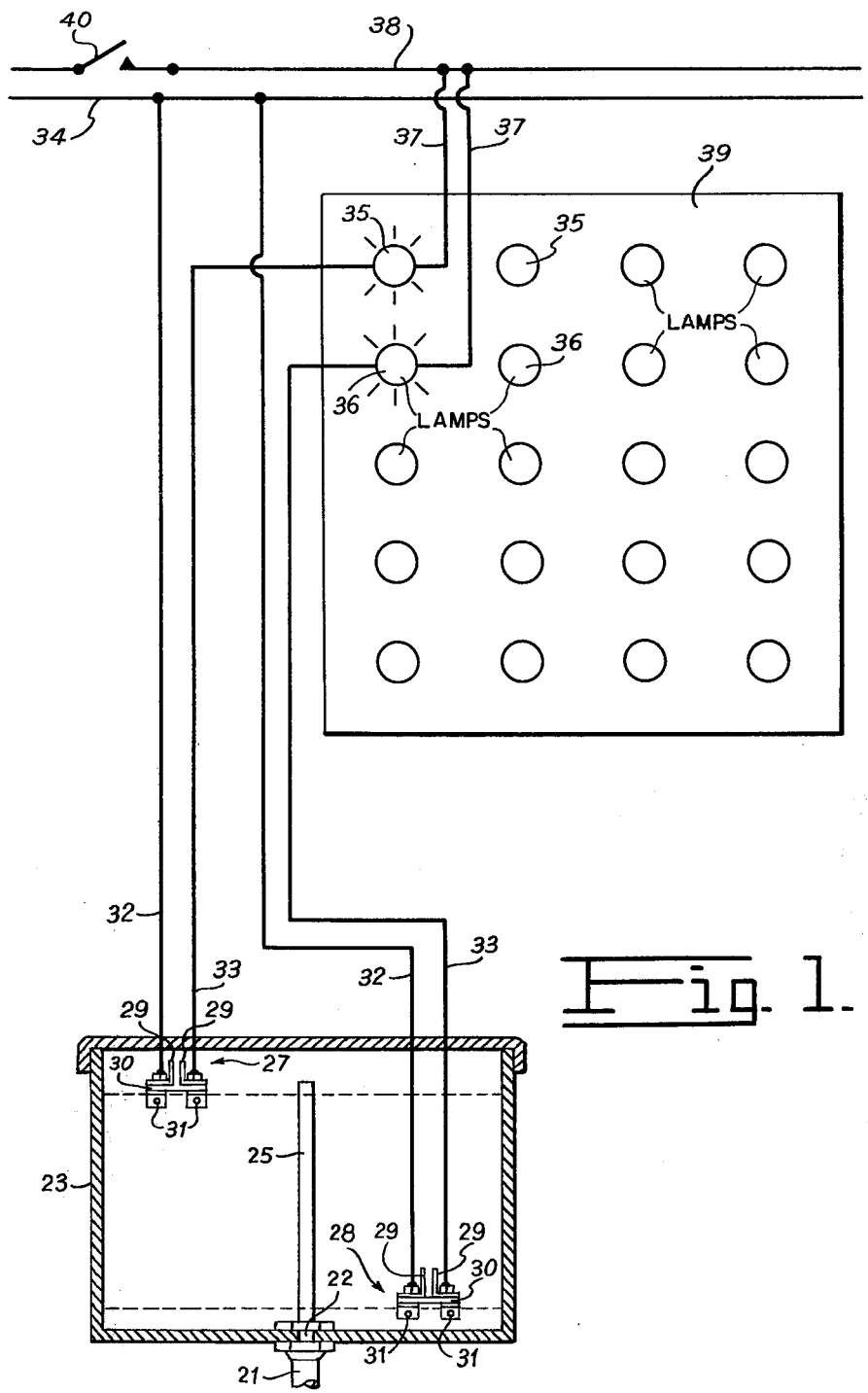
FIG. 1, is a partial schematic view of one embodiment of the electric circuit and the disposition of the remote detector for the detector to indicate leaks, of this invention.

Referring to FIGS. 4 to 6, which illustrate the preferred embodiment of this invention, the remote detector to indicate liquid leaks in stationary tanks is composed of a plurality of alternate electrical conductive electrodes 11 and 12, mounted on the inner surface of an annular support 13, which is of electrical non-conducting material. Electrodes 11 and 12 consist of a curved sheet which overlies on the inner surface of said annular support 13, said electrodes may have projections or tips 14, which project inwardly from said annular support, said tips 14 of each of the alternate groups of electrodes 11 and 12 being spaced apart a certain distance.

Each of the alternate groups of electrodes 11 and 12 are connected altogether and respectively to conducting terminals 15 and 16, one of which, according to FIG. 4 number 16, is connected to conductor 17, communicating with a power source not illustrated in the drawings, which may be any light contact near the toilet. The other conducting terminal 15 is connected to lamp 18 mounted on display board 19 which carries a plurality of lamps 18, each corresponding to a toilet, for example, in one of the rooms of a hotel, hospital, or the like, where it is desired to detect the leak. Such lamp 18 by means of conductor 19, closes the circuit, being connected to another conductor 20, which may be connected to ground.

Annular support 13 is located within the discharge tube 21 at a level slightly below the discharge orifice 22 of stationary toilet tank 23 in which accumulates a quantity of liquid 24 for periodic discharge to wash out the toilet.

Electrical conductors 15 and 16 pass through overflow pipe 25, leading respectively to the power source and to lamp 18 as above indicated.

By virtue of all the foregoing, when through a failure of the float which operates the water supply valve of tank 23 the upper level of the liquid accumulated therein may rise to the upper end of overflow pipe 25 and pass therethrough to discharge tube 21, causing an undesirable loss of liquid, and by reason of water electrical conductivity closing the circuit immediately, contact is made between tips 14 of two adjacent electrodes 11 and 12, whereby, electricity is transmitted from the domestic power outlet and conductor 17 through other conductor 16, by way of electrodes 12 and tips 14 thereof, by the water flowing between tips 14 of said adjacent electrodes 11, by way of conductor 15, of lamp 18, conductor 19 and finally conductor 20 which may be connected to ground, whereby the respective lamp 18 for the toilet in which the leak is occurring will light and indicate to the supervisor that the cause of the leak should be corrected.

If on the other hand, due to faulty operation of the valve which closes discharge outlet 22, after discharge of liquid 24 from tank 23, and undesirable leak is produced which prevents tank from refilling, water flowing from inside said tank will be passing electrodes 11 and 12, causing respective lamp 18 to light in the manner previously described and indicating to supervisor the escape of the liquid.

Discharging liquid 24 from tank 23 in normal operation will of course light corresponding lamp 13, but in a continuous manner which supervisor can easily distinguish from a leak which will cause an intermittent lighting of corresponding lamp 18.

Display board 19 may be located at a point remote from the corresponding toilets monitored, in a place visible to supervisor. Bell 26 illustrated in FIG. 4 with broken lines may be included in the circuit if it is desired to add an audible signal to the lighted one.

It should be noted that in this embodiment only a single group of electrodes located at a certain level in discharge outlet 21 and a single lamp 18 to indicate leakage of liquid are required.

In the embodiment illustrated in FIGS. 1 to 3, two groups of electrodes are used, upper group 27 and lower group 28, which are composed of angular tips 29 secured to non-conducting support plate 30 secured with pins 31 to tank wall 23. Tips 29 are spaced a certain distance apart to prevent flow of current between them, and each is connected to respective conductors 32 and 33, conductors 32 being connected to line 34 carrying electrical current and conductors 33 being connected to lamp 35 for upper electrode 27 and to lamp 36 for lower electrode 28, and from said lamps, by means of conductors 37, circuit is continued to another line 38 which may be connected to ground.

When water stored in tank 24, as illustrated in FIG. 2, because of some failure of float or feed valve is escaping through overflow pipe 25, circuit will close by way of contacts or tips 29 of upper electrodes 27, lighting the leak-indicating lamp 35 on display board 39, showing supervisor the need to attent to the indicated toilet to prevent the leakage which is occurring.

Lamp 35 which indicates leakage will, it is clear, normally be extinguished and will only light in case of leakage through overflow tube 25 of tank.

Contrarily, lamp 36 will normally be lit when tank if full; when a leak occurs through outlet orifice 22, as illustrated in FIG. 3, preventing tank from refilling, corresponding lamp 36 will go out because of the leakage. Said lamp 36 also goes out each time tank is emptied in normal operation, but will quickly light again as tank is refilled; thus supervisor will detect the failure at the lower level when lamp 36 fails to come on promptly after going out.

In order to keep lamps 35 and 36 from going on and off during hours when supervisor is not attending display board 39, general switch 40 may be included to allow manual disconnection of the circuit.

In this embodiment it will be noted that for each toilet two sets of electrodes 27 and 28 are required, as well as two lamps 35 and 36, which may be differentiated with colors or by their location on display board 39.

This second embodiment provides perfect operation; however, the first embodiment described is preferable as shown in FIGS. 4 and 5, because it is simpler and more easily installed.

Notwithstanding that the preceding description is given in relation to preferred embodiments of the invention, it will be understood by persons familiar with the subject matter that the preceding specifications and any modifications in form or detail are fully covered by the spirit and scope thereof.

I claim:

1. A remote detector to indicate discharge of electrically-conductive liquid from a stationary tank having at least one outlet pipe, comprising:

an annular support member of electrically-insulating material located within said outlet pipe;

a pair of arcuate electrodes constituted by respective curved plates of electrically-conductive material, the curved plates being secured at their convex surfaces to the interior of the annular support member at substantially the same position along the outlet pipe but being spaced apart from one another about the inner perphery of the annular support member; first and second electrical conductor members connected to the electrodes respectively; and remote indicator means connected to said first electrical conductor, whereby when said second electrical conductor and said remote indicator means are connected to respective terminals of a source of electrical energy, an electrical circuit through the remote indicator means is completed, thereby to energize the indicator means, when electrically-conductive liquid establishes electrical contact between the electrodes.

* * * * *